United States Patent [19]

Hopping, deceased

[11] 4,155,224
[45] May 22, 1979

[54] TURBINE-WHEEL POWER DEVICE

[75] Inventor: Alvin S. Hopping, deceased, late of Lake Hopatcong, N.J., Clifford A. Johnson, executor

[73] Assignee: Markley D. Fell, Hackettstown, N.J.

[21] Appl. No.: 854,148

[22] Filed: Nov. 23, 1977

[51] Int. Cl.² ............................................. F03G 7/00
[52] U.S. Cl. ...................................... 60/721; 60/370; 415/90
[58] Field of Search .............. 60/325, 650, 682, 671, 60/721, 495, 496, 497, 639, 370; 415/90

[56] References Cited

U.S. PATENT DOCUMENTS

| | | | |
|---|---|---|---|
| 3,857,242 | 12/1974 | Gilmore | 60/495 |
| 3,938,337 | 2/1976 | Fawcett et al. | 60/721 |
| 4,030,300 | 6/1977 | Thompson | 60/639 |

*Primary Examiner*—Allen M. Ostrager
*Attorney, Agent, or Firm*—Thomas N. Neiman

[57] ABSTRACT

In the embodiments shown, the device comprises a turbine wheel, rotatively journaled, having a peripheral, grooved surface onto which rounds of shot are impelled, under steam pressure, to rotate the wheel so that torque power might be derived therefrom. The turbine wheel, in turn, rotates a pulley — by means of a drive belt — which operates a sluice-type gating device. The latter device cyclically opens and closes off the pressured steam supply, and feeds a missile — a round of shot — to a conduit which terminates in adjacency to the turbine wheel, in order that the round, the missile, will be impelled through the conduit to impact upon the grooved surface of the turbine wheel and deliver a frictional, glancing, energy-transferring blow to the turbine wheel. The turbine wheel is rotatively carried on a support which is pivotally mounted, so that the turbine wheel can be moved into and out of proximity with the missile-impelling conduit in order to optimize missile impact.

9 Claims, 3 Drawing Figures

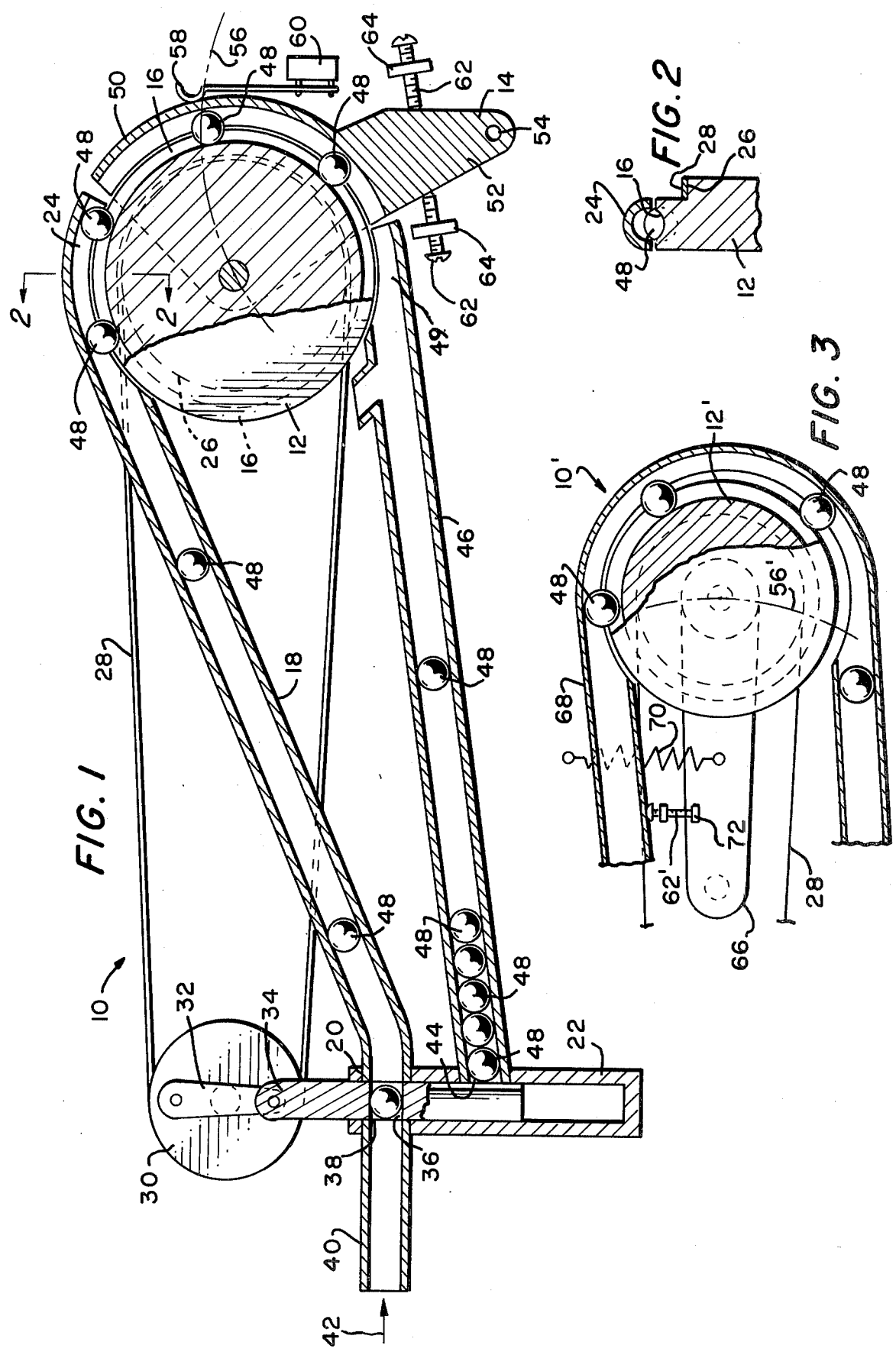

TURBINE-WHEEL POWER DEVICE

This invention pertains to turbine-wheel power devices, and in particular to such devices operated by missiles impelled by low-cost energized fluids.

Turbine-wheel power devices known in the prior art which are powered by the direct contact of an energized fluid, such as steam, are reasonably efficient. However, such power devices have failed to take advantage of the power inhering in masses impelled with great velocity. Such masses store energy and, on impact, transfer the same to impart great force to the surface upon which they impinge. By analogy, a water wheel generates a fair torque through the force of the flowing water operating against the blades. Yet, upon a log impinging upon a blade, a markedly greater force is transferred to the wheel — as a considerable store of energy, proceeding from both the mass and velocity of the log, is imparted thereto.

It is an object of this invention, then, to set forth an improved turbine-wheel power device which tekes advantage of the energy transfer offered in the mass and velocity of impelled missiles. Particularly, it is an object of this invention to set forth a turbine-wheel power device comprising a journaled turbine wheel; said turbine wheel having a missile-impingement surface; and means for addressing missiles to said surface to cause said turbine wheel to rotate.

Further objects of this invention, as well as the novel features thereof, will become more apparent by reference to the following description taken in conjunction with the accompanying figures, in which:

FIG. 1 is a vertical, cross-sectional illustration of a first embodiment of the invention;

FIG. 2 is a cross-sectional view taken along section 2—2 of FIG. 1; and

FIG. 3 is a simplified, line drawing of a portion of an alternative embodiment of the invention.

As shown in the Figures, the improved turbine-wheel power device 10, according to this first embodiment, comprises a turbine wheel 12 which is rotatively journaled in a support 14. The turbine wheel 12 has a peripheral groove 16 formed thereon, the groove defining a missile impingement surface. A missile supply conduit 18 opens at one end 20 within a plunger chamber 22. The other end of conduit 18 is formed with an arcuate, substantially semi-circular shroud 24 which is supported (by means not shown) in close proximity to the turbine wheel groove 16. The one side of the turbine wheel 12 has a circular pulley-belt land 26 which receives a drive belt 28. The drive belt 28 is also engaged with a pulley wheel 30 which is rotatively carried on a support (not shown).

The pulley wheel 30 carries a pivotally mounted crank 32 which is further pivotally coupled to a plunger 34. The plunger 34 is slidably received in the plunger chamber 22, and it has a single through-going orifice 36 formed therein. The chamber 22 also has a single through-going orifice 38 formed therein, the orifice 38 receiving — at each side thereof — an end of conduit 18 and an end of a steam-pressure supply pipe 40. Pipe 40 introduces pressured steam from a supply thereof represented by the arrow 42.

The chamber 22 has a missile entry port 44 formed therein which opens internally of the chamber and also receives one end of a missile return conduit 46. Conduit 46 too has a substantially semi-circular shroud 49 which, like shroud 24, is supported in close proximity to the turbine wheel groove 16. Conduit 46 collects energy-spent missiles therein and, repetitively, supplies single missiles to the plunger 34.

As can be seen, the rotation of the turbine wheel 12 imparts rotation to the pulley wheel 30, and the latter, in turn, causes the plunger 34 to reciprocate in chamber 22. As a consequence, two circumstances proceed therefrom. For one, the steam supply is cyclically interrupted; the energized fluid develops a considerable head of pressure while the sluice-type gating means of the plunger 34 and chamber 22 block the pipe 40. Also, the plunger orifice 36 moves into registry with the missile entry port 44 to admit a single missile 48. Upon the plunger rising, carrying the single missile 48, it then comes into registry with the pipe 40 and conduit 18, and the built-up head of steam pressure accelerates the missile 48 with great energy along the conduit 18. As the missile 48 reaches the shroud 24 of the conduit 18 it delivers a frictional, glancing and energy-transferring blow to the surface groove 16 of the turbine wheel 12. Also, to insure that all energy and momentum which may be derived from the missile 48 is imparted to the turbine wheel 12, support 14 envelops a segment of the turbine wheel 12 with a further arcuate, substantially semi-circular shroud 50.

Support 14 has an extending limb 52 which is pivotally mounted at 54 (to means not shown) so that the same may be moved through the arc 56. By this arrangement, the turbine wheel groove 16 may be selectively placed in the most optimum positioning, relative to conduit 18, which will cause the missiles to impart maximum energy to the turbine wheel 12. Becasue of the shock with which the missiles 48 impact the turbine wheel 12, and to accommodate for some damping, a biasing spring 58 is supported on a mounting block 60 to restrain the support 14 resiliently in its optimum positioning. Limit stop adjustment screws 62 are threadedly engaged with mounting blocks 64 to address the screw ends to the support limb 52; screws 62 retain the limb 52 within a coarse positioning relative to the turbine wheel 12.

In simplified line drawing, FIG. 3 depicts an alternative embodiment of the novel turbine-wheel power device 10' in which similar or same index numbers denote similar or same components thereof as are shown in FIGS. 1 and 2. In this embodiment, the turbine wheel 12' is carried rotatively at one end of a pivotally mounted limb or support 66. Also, the missile supply and return conduits are joined in one conduit element 68. One end of an extension spring 70 is fixed to the support 66, the other spring end being fixed to a stable support (not shown). Again, a limit-stop screw 62' engages a stanchion 72 which projects from the support 66.

While not shown, it will be self-evident that a battery of such devices 10 and 10' can be structured, there being a number of pipes 40, conduits 18 and 46 (or 68), and chambers 22 and plungers 34, disposed in juxtaposition to operate upon a turbine wheel which has a series of concentric, spaced apart grooves 16, in order to multiply the power which may be derived from the steam-impelled missiles 48. In such an enhanced structure, the sluice-gate-type regulating means comprised of the plungers 34 and chambers 22 would function as though manifolded, each thereof "firing" in an ordered sequence. Accordingly, while I have described my invention in connection with specific embodiments thereof it is to be clearly understood that this is done only by way of example and not as a limitation to the scope of my invention as set forth in the objects thereof and in the appended claims. Rather, all embodiments which proceed from my teaching herein are deemed within the ambit of my invention.

I claim:

1. A turbine-wheel power device, comprising:
   a journaled turbine wheel;
   said turbine wheel having a missile-impingement surface; and
   means for addressing missiles to said surface to cause said turbine wheel to rotate; wherein
   said missile-addressing means comprises a conduit, means for supplying missiles to said conduit, and means for impelling missiles through said conduit; and
   said conduit and said impelling means comprise cooperative to cause impelled missiles to impact with said surface with a frictional, glancing, energy-transferring blow.

2. A turbine-wheel power device, according to claim 1, wherein:
   said missiles-impelling means comprises a source of energized fluid; and
   one end of said conduit opens onto said energized fluid source.

3. A turbine-wheel power device, according to claim 2, further including:
   regulating means operatively coupled to said energized-fluid source for open and closing off a communication of said source with said one end of said conduit.

4. A turbine-wheel power device, according to claim 3, further including:
   means powered by said turbine wheel and coupled to said regulating means for operating said latter means.

5. A turbine-wheel power device, according to claim 1, wherein:
   said turbine wheel is journaled on a support; and further including
   means for displacing said support to cause said turbine wheel to move into and out of proximity of said conduit to optimize missile impact.

6. A turbine-wheel power device, according to claim 5, wherein:
   said support-displacing means comprises means mounting said support on a pivot for movement thereof through an arc.

7. A turbine-wheel power device, according to claim 3, wherein:
   said regulating means comprises a sluice-type gating device;
   said device including a reciprocatable plunger, and a chamber which slidably receives said plunger;
   said chamber having a through-going aperture and an entry port formed therein, said port and aperture being spaced apart from each other;
   said plunger also having an aperture formed therein alternately registerable with said chamber aperture and said chamber port upon reciprocation thereof within said chamber; and further including
   means powered by said turbine wheel and coupled to said plunger for causing reciprocation of said plunger.

8. A turbine-wheel power device, according to claim 7, further including:
   means communicating said turbine wheel and said entry port for conducting energy-spent missiles from said turbine wheel to said port.

9. A turbine-wheel power device, according to claim 2, wherein:
   said energized fluid comprises steam under pressure.

* * * * *